(12) United States Patent
Liu et al.

(10) Patent No.: US 9,529,482 B2
(45) Date of Patent: Dec. 27, 2016

(54) CAPACITIVE IN-CELL TOUCH SCREEN AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongjuan Liu, Beijing (CN); Xue Dong, Beijing (CN); Haisheng Wang, Beijing (CN); Shengji Yang, Beijing (CN); Lei Wang, Beijing (CN); Chunlei Wang, Beijing (CN); Yingming Liu, Beijing (CN); Tao Ren, Beijing (CN); Weijie Zhao, Beijing (CN); Xiaoliang Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 166 days.

(21) Appl. No.: 14/387,132

(22) PCT Filed: Nov. 25, 2013

(86) PCT No.: PCT/CN2013/087781
§ 371 (c)(1),
(2) Date: Sep. 22, 2014

(87) PCT Pub. No.: WO2014/166260
PCT Pub. Date: Oct. 16, 2014

(65) Prior Publication Data
US 2016/0188029 A1 Jun. 30, 2016

(30) Foreign Application Priority Data
Apr. 7, 2013 (CN) .......................... 2013 1 0117135

(51) Int. Cl.
*G06F 3/044* (2006.01)
*G02F 1/1333* (2006.01)
*G06F 3/041* (2006.01)

(52) U.S. Cl.
CPC ........... *G06F 3/044* (2013.01); *G02F 1/13338* (2013.01); *G06F 3/0412* (2013.01)

(58) Field of Classification Search
None
See application file for complete search history.

(56) References Cited

U.S. PATENT DOCUMENTS 9,170,692 B2 * 10/2015 Yang ................. G02F 1/134336
2009/0256818 A1 * 10/2009 Noguchi ............. G02F 1/13338
345/174

(Continued)

FOREIGN PATENT DOCUMENTS

CN     102141700 A     8/2011
CN     102841716 A    12/2012

(Continued)

OTHER PUBLICATIONS

First Chinese Office Action dated Aug. 7, 2015; Appln. No. 201310117135.1.

(Continued)

*Primary Examiner* — Seokyun Moon
(74) *Attorney, Agent, or Firm* — Ladas & Parry LLP (57) ABSTRACT

In a capacitive in-cell touch screen and a display device, the common electrode layer connected in the entire surface in the array substrate is divided to form touch driving electrodes and common electrodes which are insulated from each other and alternatively disposed, touch sensing electrodes are disposed on the upper substrate and touch driving electrodes are driven in a time-division manner to realize touch function and display function. Disposing projections (Continued)

of touch sensing electrodes on the array substrate in areas where common electrodes are may reduce right opposite areas between touch sensing electrodes and touch driving electrodes, thereby reduce opposite capacitance; providing sides of touch driving electrodes and adjacent sides of common electrodes as broken lines and providing consistent shapes for touch sensing electrodes and common electrodes may increase opposite areas between touch driving electrodes and touch sensing electrodes, thereby increasing projection capacitance per unit area. By increasing the proportion of projection capacitance over opposite capacitance, it is possible to increase proportion of variation amount of mutual capacitance caused by finger touching, and hence improving the touch accuracy.

17 Claims, 8 Drawing Sheets

(56) References Cited

U.S. PATENT DOCUMENTS

| | | | | |
|---|---|---|---|---|
| 2010/0085324 A1* | 4/2010 | Noguchi | ............... | G06F 3/044 345/174 |
| 2010/0289765 A1* | 11/2010 | Noguchi | ............. | G02F 1/13338 345/173 |
| 2012/0249444 A1* | 10/2012 | Lee | ............... | G06F 3/0412 345/173 |
| 2012/0274603 A1* | 11/2012 | Kim | ............... | G06F 3/0412 345/174 |
| 2013/0113735 A1* | 5/2013 | Takeuchi | ............. | G06F 3/0412 345/173 |
| 2013/0328812 A1* | 12/2013 | Kim | ............... | G06F 3/044 345/173 |
| 2014/0055685 A1 | 2/2014 | Wang et al. | | |
| 2014/0071360 A1* | 3/2014 | Chang | ............... | G06F 3/0412 349/12 |
| 2014/0104510 A1* | 4/2014 | Wang | ............... | G06F 3/0412 349/12 |
| 2014/0111710 A1* | 4/2014 | Yang | ............... | G06F 3/0412 349/12 |
| 2014/0333582 A1* | 11/2014 | Huo | ............... | G02F 1/13338 345/174 |
| 2015/0015517 A1* | 1/2015 | Zhao | ............... | G06F 3/048 345/173 |
| 2015/0029118 A1* | 1/2015 | Xu | ............... | G06F 3/044 345/173 |
| 2015/0145821 A1* | 5/2015 | Kim | ............... | G06F 3/0412 345/174 |
| 2015/0220174 A1* | 8/2015 | Mu | ............... | G06F 3/044 345/174 |
| 2015/0309630 A1* | 10/2015 | Yang | ............... | G02F 1/1333 345/206 |
| 2015/0378390 A1* | 12/2015 | Liu | ............... | G06F 3/0412 345/173 |
| 2016/0026289 A1* | 1/2016 | Liu | ............... | G06F 3/044 345/174 |
| 2016/0026290 A1* | 1/2016 | Liu | ............... | G06F 3/0412 345/174 |
| 2016/0034064 A1* | 2/2016 | Ding | ............... | G06F 3/044 345/174 |

FOREIGN PATENT DOCUMENTS

| | | |
|---|---|---|
| CN | 102914920 A | 2/2013 |
| CN | 102945106 A | 2/2013 |
| CN | 103218097 A | 7/2013 |
| CN | 203178998 U | 9/2013 |

OTHER PUBLICATIONS

Written Opinion of the International Searching Authority dated Feb. 19, 2014; PCT/CN2013/087781.

International Search Report Appln. No. PCT/CN2013/087781; Dated 20-27-2014.

* cited by examiner

CAPACITIVE IN-CELL TOUCH SCREEN AND DISPLAY DEVICE

FIELD OF THE INVENTION

The embodiments of the present invention relate to a capacitive in-cell touch screen and a display device.

BACKGROUND

With the fast development of display technology, touch screen panels have gradually become popular in life. At present, depending on their constituting structures, touch panels may be classified into add on mode touch panels, on cell touch panels and in-cell touch panels. For add on mode touch panels, the touch panel and the liquid crystal display are produced separately and then attached together to form a liquid crystal display with touch function, which suffer disadvantages such as high manufacturing costs, low light transmission rate and thick modules. While for in-cell touch panels, touch electrodes of the touch panel are embedded inside the liquid crystal display, which could reduce the overall thickness of the module and also greatly decrease manufacturing costs of the touch panel, winning good graces of panel manufacturers.

Figure 1:
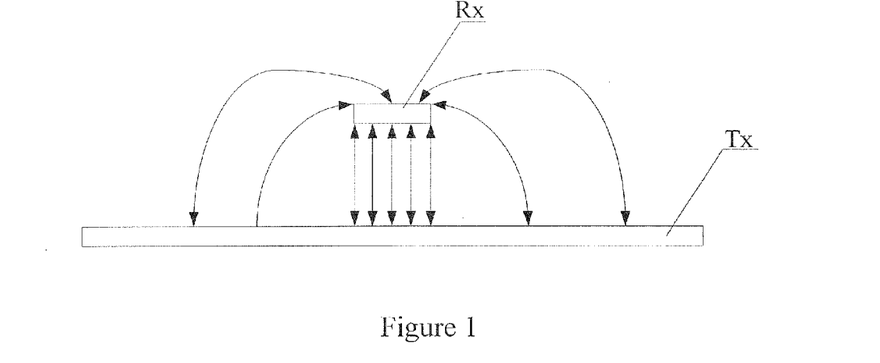
FIG. 1 is a schematic diagram of capacitance generated between touch driving electrodes and touch sensing electrodes of prior art.

At present, prior art capacitive in-cell touch panels are implemented by adding directly touch driving electrodes and touch sensing electrodes on existing TFT (Thin Film Transistor) array substrates, that is, manufacturing two layers of strip electrodes intersecting in different planes on the surface of the TFT array substrate. These two layers of ITO (Indium Tin Oxides) electrodes serve as touch driving electrodes and touch sensing electrodes of the touch panel respectively. As shown in FIG. 1, a mutual capacitance $C_m$ is generated due to the coupling between the transversely disposed touch driving electrodes Tx and longitudinally disposed touch sensing electrodes Rx. When a finger touches the screen, the touching of finger would change the value of mutual capacitance $C_m$. A touch detection device detects the location of the finger's touch point by detecting the variation amount of a current corresponding to the capacitance $C_m$ before and after touching.

As shown in FIG. 1, two kinds of mutual capacitances $C_m$ are generated between the transversely disposed touch driving electrodes Tx and longitudinally disposed touch sensing electrodes Rx. One is a projection capacitance effective for realizing touch function (curve with arrow in FIG. 1), which changes the value of the projection capacitance when a finger touches the screen. Another is an opposite capacitance useless for realizing touch function (straight line with arrows). When touch driving electrodes and touch sensing electrodes have too large right opposite areas in vertical direction, the opposite capacitance formed at the right opposite areas will be too large relative to the projection capacitance, resulting in a large detection initial value of the touch detection device, making it impossible to accurately detect minute variation of signals of the projection capacitance after a finger touches the screen. This causes a reduced SNR of the touch screen and in turn impacts the accuracy of touch sensing in an in-cell touch panel.

SUMMARY

Embodiments of the present invention provide a capacitive in-cell touch screen and a display device to address low accuracy of touch sensing in prior art in-cell touch panels.

An embodiment of the present invention provides a capacitive in-cell touch screen comprising an upper substrate, an array substrate with a common electrode layer and a liquid crystal layer between the upper substrate and the array substrate. The common electrode layer of the array substrate consists of a plurality of touch driving electrodes and a plurality of common electrodes, the plurality of touch driving electrodes and the plurality of common electrodes are insulated from each other. The touch driving electrodes and common electrodes are disposed alternatively, and sides of each of the touch driving electrodes and sides of each of said the adjacent common electrodes are both non-straight lines. During the display time for one frame of picture, a plurality of the touch driving electrodes are loaded with common electrode signals and touch scanning signals in a time division manner. The upper substrate has a plurality of touch sensing electrodes which orthogonal projections on the array substrate are located in areas where the common electrodes are, and the shape of the touch sensing electrodes coincide with the shape of areas where the common electrodes are.

An embodiment of the present invention provides a display device including the capacitive in-cell touch screen provided in embodiments of the present invention.

In the capacitive in-cell touch screen and the display device provided in embodiments of the present invention, the common electrode layer connected in the entire surface in the array substrate is divided to form touch driving electrodes and common electrodes, the touch driving electrodes and common electrodes insulated from each other and alternatively disposed, touch sensing electrodes are disposed on the upper substrate and touch driving electrodes are driven in a time-division manner to realize touch function and display function. In the above-mentioned touch screen provided in embodiments of the present invention, projections of touch sensing electrodes on the array substrate are disposed in areas where common electrodes are, while common electrodes and touch driving electrodes are located in the same layer and insulated from each other, therefore it's possible to effectively reduce right opposite areas between touch sensing electrodes and touch driving electrodes, hence reducing the opposite capacitance formed at the right opposite areas. Furthermore, sides of touch driving electrodes and sides of adjacent common electrodes are both set as non-straight lines, and shapes of touch sensing electrodes and areas where common electrodes are set to be consistent, therefore it is possible to increase opposite areas between touch driving electrodes and touch sensing electrodes adjacent to each other, and thereby increasing projection capacitance between touch driving electrodes and touch sensing electrodes per unit area. By increasing the proportion of projection capacitance over opposite capacitance, it is possible to increase proportion of variation amount of mutual capacitance caused by finger touching, and hence improving the touch accuracy.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAIL DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, liquid crystal display technologies that can realize wide viewing angles mainly include In-Plane Switch (IPS) technology and Advanced Super Dimension Switch (ADS) technology. In the ADS technology, a multi-dimensional electric field is formed with an electric field produced at edges of slit electrodes in the same plane and an electric field produced between a slit electrode layer and a plate electrode layer, so that liquid crystal molecules at all orientations, which are located between slit electrodes and directly above the electrodes in a liquid crystal cell, can be rotated, which enhances the work efficiency of liquid crystals and increases light transmittance. The ADS technology can improve the picture quality of TFT-LCD products and has advantages of high resolution, high transmissivity, low power dissipation, wide viewing angles, high opening ratio, low chromatic aberration, and no push Mura, etc. H-ADS (high opening ratio-Advanced Super Dimension Switch) is one important implementation of ADS technology.

Embodiments of the present invention propose a new capacitive in-cell touch screen structure based on ADS and H-ADS technologies. Herein below, with reference to the accompanying drawings, specific implementations of the capacitive in-cell touch screen and the display device provided in embodiments of the present invention will be described in detail. Thicknesses and shapes of layers of films in the drawings do not reflect the real scale of the array substrate or the upper substrate, but only aim to illustrate contents of the present invention.

Figure 2:
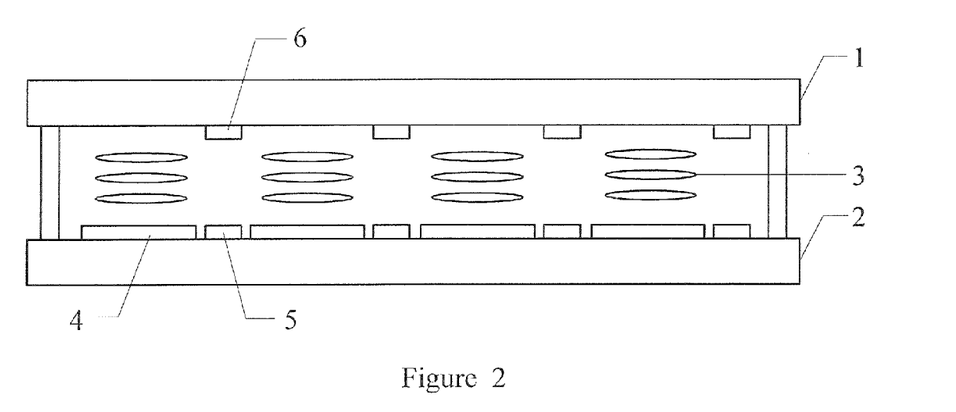
FIG. 2 is a structure diagram of a capacitive in-cell touch screen provided in an embodiment of the present invention.

FIG. 2 is a transverse sectional view of the capacitive in-cell touch screen provided in an embodiment of the present invention. As shown in FIG. 2, the capacitive in-cell touch screen provided in an embodiment of the present invention specifically includes: an upper substrate 1, an array substrate 2 with a common electrode layer, and a liquid crystal layer 3 between the upper substrate 1 and the array substrate 2.

The common electrode layer of the array substrate 2 consists of a plurality of touch driving electrodes 4 and a plurality of common electrodes 5, which are insulated from each other. Touch driving electrodes 4 and common electrodes 5 are disposed alternatively, and sides of touch driving electrodes 4 and sides of adjacent common electrodes 5 are both non-straight lines (not shown in FIG. 2). During the display time for one frame of picture, individual touch driving electrodes 4 are loaded with common electrode signals and touch scanning signals in a time division manner.

The upper substrate 1 has a plurality of touch sensing electrodes 6 with orthogonal projections on the array substrate 2 located in areas where the common electrodes 5 are, and the touch sensing electrodes 6 and the areas where the common electrodes are have the same shape (not shown in FIG. 2).

In the above-mentioned capacitive in-cell touch screen provided in embodiments of the present invention, projections of touch sensing electrodes on the array substrate are disposed in the areas where common electrodes are, while common electrodes and touch driving electrodes are located in the same layer and insulated from each other, therefore it's possible to effectively reduce right opposite areas between touch sensing electrodes and touch driving electrodes, hence reducing the opposite capacitance formed at the right opposite areas. Furthermore, sides of touch driving electrodes and sides of adjacent common electrodes are both set as non-straight lines, and the touch sensing electrodes and the areas where common electrodes are have the same shape, therefore it is possible to increase opposite areas between adjacent touch driving electrodes and touch sensing electrodes, and thereby increasing projection capacitance between touch driving electrodes and touch sensing electrodes per unit area. By increasing the proportion of projection capacitance over opposite capacitance, it is possible to increase proportion of variation amount of mutual capacitance caused by finger touching, and in turn improve the touch accuracy.

Further, in the above-mentioned touch screen provided in embodiments of the present invention, since touching phase and displaying phase are driven with time division mode, on the one hand it is possible to integrate chips for display driving and touch driving as one to further reduce the production costs; on the other hand, time-division driving can also reduce mutual interference between display and touch, hence improving picture quality and touch accuracy.

Figure 3:
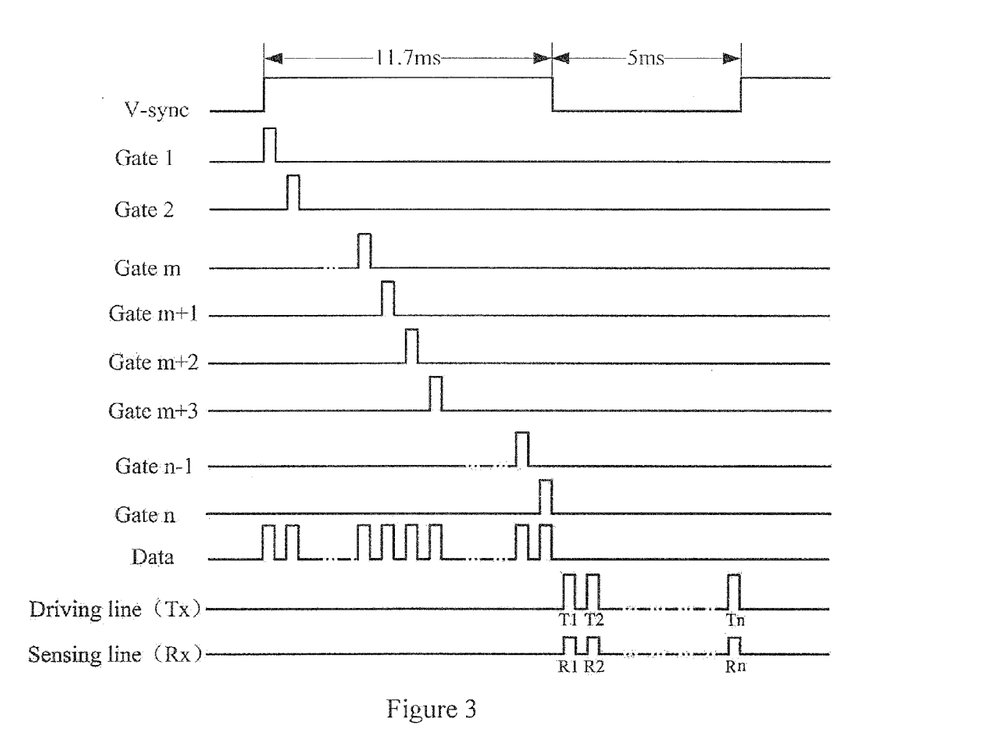
FIG. 3 is a diagram showing a driving time sequence of a capacitive in-cell touch screen provided in an embodiment of the present invention.

Specifically, for example, in the driving time sequence diagram shown in FIG. 3, the duration for the touch screen to display each frame (V-sync) is divided into a display interval (Display) and a touch interval (Touch). For example, a duration for the touch screen to display a frame in the driving time sequence as shown in FIG. 3 is 16.7 ms, 5 ms thereof is selected as the touch interval, other 11.7 ms is selected as the display interval. Of course, it is also possible to appropriately adjust both intervals according to the processing capacity of IC chips, which is not limited specifically here. In the display interval (Display), each gate signal line in the touch screen, namely gate line 1, gate line 2, ..., gate line n are applied with a gate scanning signal in turn, and data signal lines are applied with a gray scale signal, and accordingly now touch driving electrodes function as common electrodes, and IC chips connected with touch driving electrodes supply constant common electrode signal to them, thereby realizing liquid crystal display function. In the touch interval (Touch), the IC chips connected with touch driving electrodes supply touch driving electrodes with touch scanning signals T1, T2, ... Tn respectively, and at the same time, touch sensing electrodes detect touch sensing signals R1, R2, ... Rn respectively to realize touch function. In the touch interval, each gate signal line and data signal line in the touch screen has no signal input. And, in the display interval and the touch interval, common electrodes in the common electrode layer are always loaded with common electrode signal. Alternatively, in the display interval, common electrodes are loaded with a common electrode signal, and in the touch interval, common electrodes are grounded or floating which means no signal is input.

For example, generally, a plurality of pixel units arranged in matrix are formed in the capacitive in-cell touch screen, and preferably, touch driving electrodes 4 generally extend along the row direction of pixel units. Touch sensing electrodes 6 and common electrodes 5 extend along the column direction of pixel units. Of course, it is also possible to change the wiring directions of both according to sizes of application devices, that is, touch driving electrodes 4 are disposed to extend along the column direction of pixel units, touch sensing electrodes 6 and common electrodes 5 are disposed to extend along the row direction of pixel units, which is not limited here.

Hereinbelow, description is given with respect to an example in which touch driving electrodes 4 extend along row direction of pixel units and touch sensing electrodes 6 extend along column direction of pixel units.

Specific structures of touch driving electrodes for realizing touch function in the above-mentioned touch screen will be described in detail below.

Figure 4:
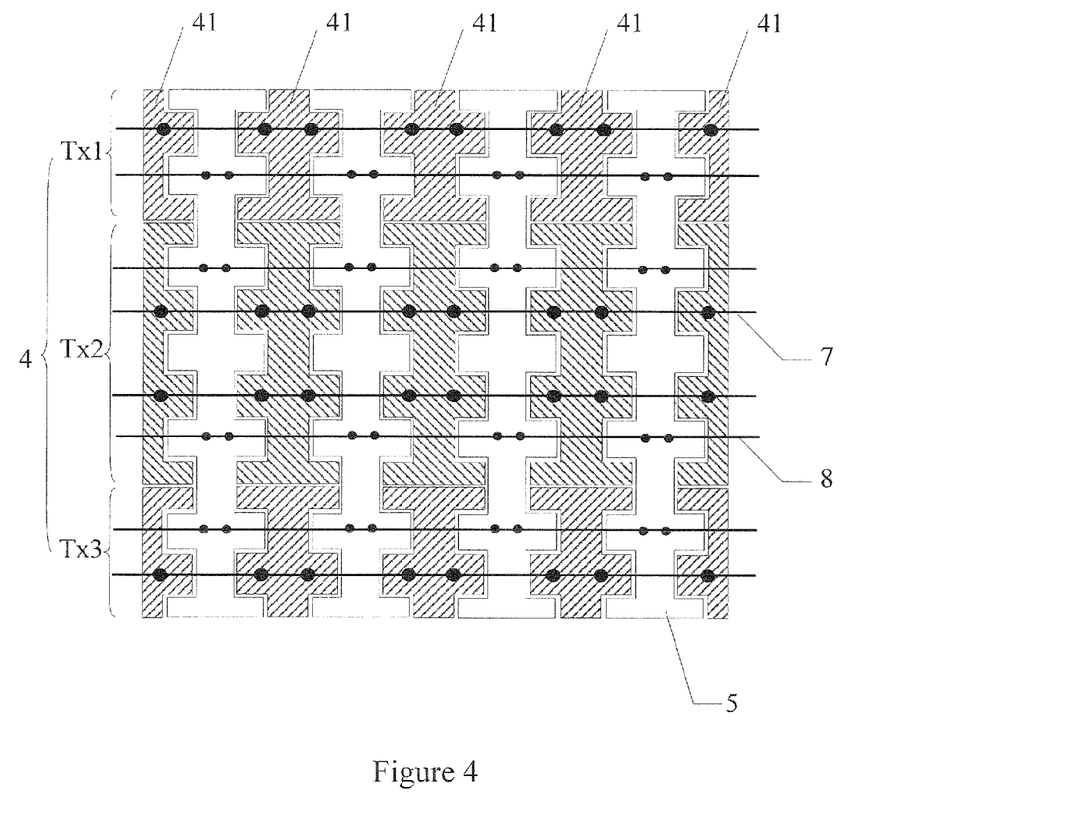
FIG. 4 is a top view I of an array substrate in the capacitive in-cell touch screen provided in an embodiment of the present invention.

Specifically, since touch driving electrodes 4 and common electrodes 5 are insulated from each other and constitute together a common electrode layer, in the detailed design of common electrode layer, as shown in FIG. 4, it is possible to provide common electrodes 5 as strip electrodes extending in the column direction of pixel units, touch driving electrodes 4 extend in the row direction of pixel units and each is divided into a plurality of touch driving sub-electrodes 41 disposed in the same row, and the ouch driving sub-electrodes 41 are disposed in the gap between adjacent common electrodes 5. For example, FIG. 4 shows a touch driving electrode Tx1 consisting of 5 touch driving sub-electrodes 41, and Tx2, Tx3 also consisting of 5 touch driving sub-electrodes 41.

Figure 5:
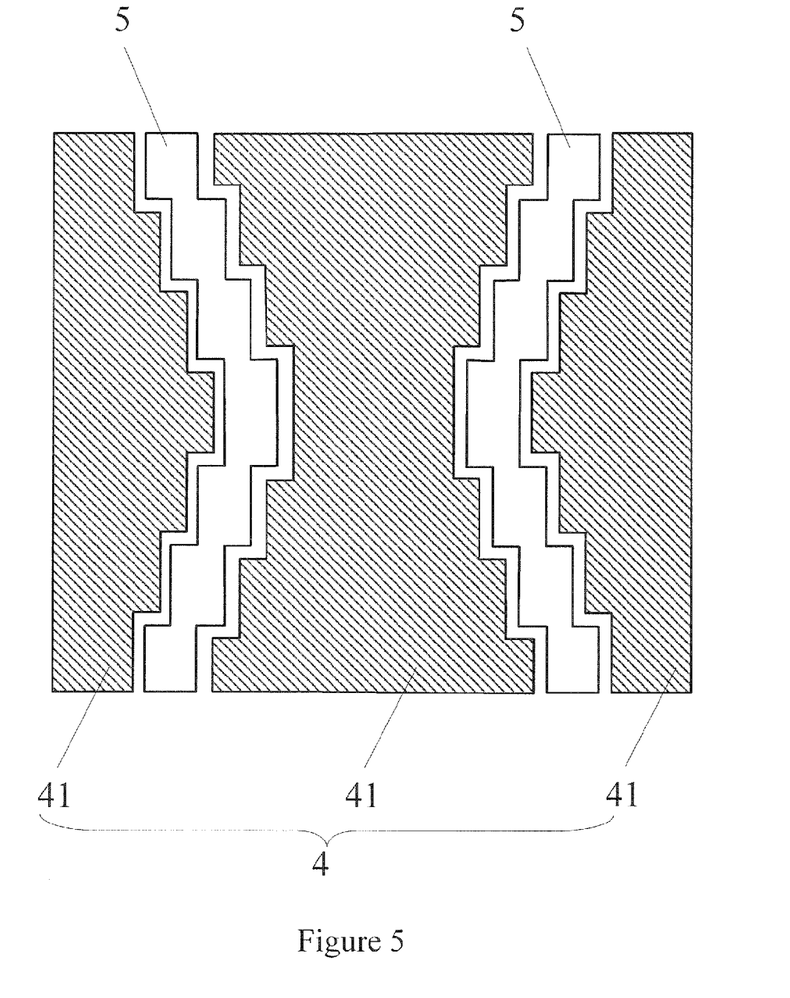
FIG. 5 is a top view II of an array substrate in the capacitive in-cell touch screen provided in an embodiment of the present invention.

And in the touch screen provided in embodiments of the present invention, sides of touch driving electrodes 4 and sides of common electrodes 5 adjacent to touch driving electrodes 4 are both non-straight lines. In a specific implementation as shown in FIG. 4, both sides of touch driving electrodes 4 and sides of common electrodes 5 which are adjacent to each other have concave-convex structures fitting each other. Alternatively, it is also possible as shown in FIG. 5, that both sides of touch driving electrodes 4 and sides of common electrodes 5 which are adjacent to each other have step-like structures fitting each other. And in a specific implementation, combination of concave-convex structures and step-like structures for broken line structures of sides is also possible. Of course, it is also possible to design the shape of non-straight lines according to practical requirements, which is not limited here.

Of course, while designing the common electrode layer specifically, it is also possible to provide touch driving electrodes as strip electrodes extending in the row direction of pixel units; provide common electrodes as extending in the column direction of pixel units and divide each common electrode into a plurality of common sub-electrodes disposed in the same column and in the gaps between adjacent touch driving sub-electrodes. Now, in order to ensure there is no right opposite areas between touch sensing electrodes and touch driving electrodes, correspondingly to the common electrodes, a touch sensing electrode also consists of a plurality of touch sensing sub-electrodes disposed in the same column.

Specifically, in the common electrode layer design as shown in FIG. 4, there may also be a plurality of touch driving signal lines 7 between adjacent pixel units in the array substrate and touch driving sub-electrodes 41 of each touch driving electrode 4 are electrically connected through at least one touch driving signal line 7. For example, the touch driving signal lines 7 generally extend in the row direction of pixel units, that is, touch driving signal lines 7 are located in the gaps between pixel units of adjacent rows.

Preferably, during specific implementation, touch driving signal lines 7 may be disposed in the same layer as gate signal lines in the array substrate; and touch driving signal lines 7 are electrically connected with corresponding touch driving sub-electrodes 41 through at least one via hole. In this way, no extra manufacturing process is needed when manufacturing the array substrate, only one patterning process is required to form patterns of touch driving signal lines 7 and gate signal lines, thereby saving manufacturing costs and improving added value of the products.

Furthermore, since the common electrode layer is generally made of ITO material, while ITO material has a high resistance, electrically connecting touch driving signal lines 7 made of metal with touch driving electrodes 4 is equivalent to connecting in parallel, the ITO electrodes and a metallic resistor consisting of a plurality of touch driving signal lines such that the resistance of touch driving electrodes is reduced to the maximum extent and SNR with which electrodes transfer signals is thus improved.

Specifically, there may also be a plurality of common electrode signal lines 8 between adjacent pixel units in the array substrate. Common electrodes 5 are electrically connected with common electrode signal lines 8 and provide common electrode signals to common electrodes through common electrode signal lines 8. For example, common electrode signal lines 8 generally extend in the row direction of pixel units, as shown in FIG. 4, that is, common electrode signal lines 8 are located in the gaps between adjacent rows of pixel units. Of course, common electrode signal lines 8 may also extend in the column direction of pixel units, that is, common electrode signal lines 8 extend across corresponding common electrodes 5. Extending direction of common electrode signal lines 8 are not specifically limited here.

Preferably, when common electrode signal lines 8 extend in the row direction of pixel units, it is possible to dispose common electrode signal lines 8 in the same layer as gate signal lines in the array substrate; and common electrode signal lines 8 are electrically connected with corresponding common electrodes 5 through at least one via hole. When common electrode signal lines 8 extend in the column direction of pixel units, it is possible to dispose common electrode signal lines 8 in the same layer as data signal lines in the array substrate; and common electrode signal lines 8 are electrically connected with corresponding common electrodes 5 through at least one via hole. In this way, no extra manufacturing process is needed when manufacturing the array substrate, only one patterning process is required to form patterns of common electrode signal lines 8 and gate signal lines or data signal lines, thereby saving manufacturing costs and improving added value of the products.

Furthermore, since the common electrode layer is generally made of ITO material, while ITO material has a high resistance, electrically connecting common electrode signal lines 8 made of metal with common electrodes 5 is equivalent to connecting in parallel the ITO electrodes and a plurality metallic resistor consisting of common electrode signal lines, such that the resistance of touch driving electrodes is reduced to the maximum extent and SNR with which electrodes transfer signals is thus improved.

Figure 6:
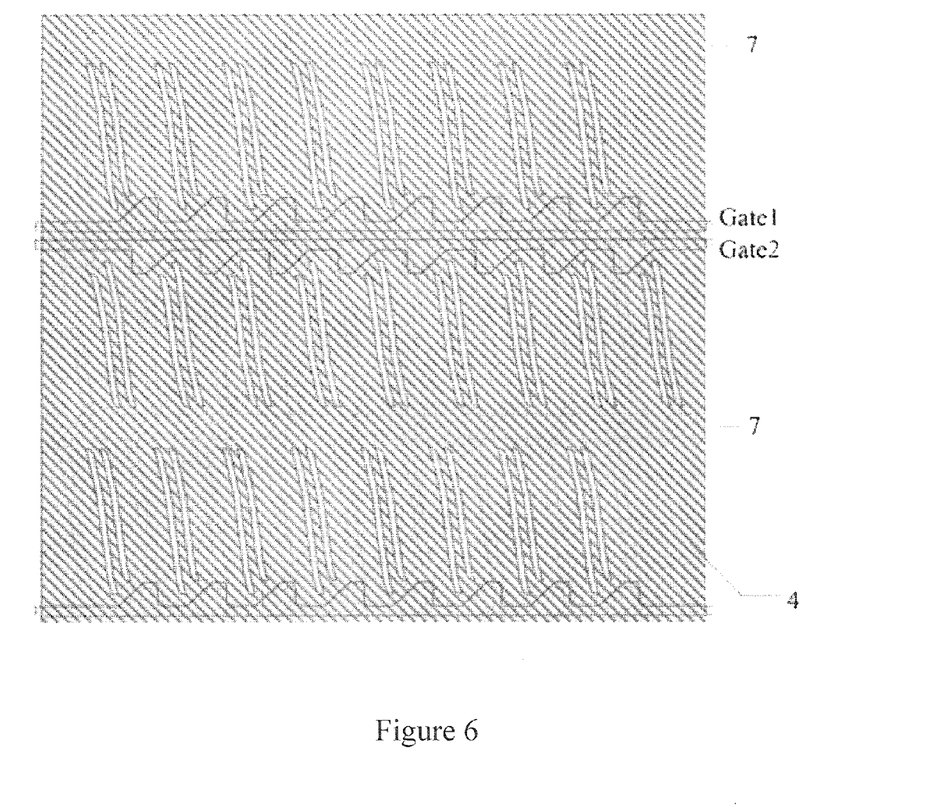
FIG. 6 is a top view III of an array substrate in the capacitive in-cell touch screen provided in an embodiment of the present invention.

Preferably, in order to ensure the opening ratio of large size touch screens to the maximum extent, for example, a structure shown FIG. 6 may be used for the pixel structure in the array substrate of the touch screen provided in embodiments of the present invention in specific implementations. In this structure, every two adjacent rows of pixel units in the array substrate are as a pixel unit group, and there are two gate signal lines between the two rows of pixel units for providing gate scanning signals to one of the two rows of pixel units, for example, G1 and G2 in FIG. 6. Thus, it is possible to design TFT switches in the adjacent two rows of pixel units together, which accordingly can reduce the area of the black matrix for blocking TFT switches and gate lines, thereby helping to improve the opening ratio of the touch display screen.

Furthermore, with the above-mentioned pixel structure in FIG. 6, positions for gate signal lines between adjacent pixel unit groups may be saved by modifying positions of gate signal lines and TFT switches of adjacent two rows of pixel units. Thus, as shown in FIG. 6, it is possible to dispose touch driving signal lines 7 and common electrode signal lines (not shown in FIG. 6) in the gaps between adjacent pixel unit groups, that is, each touch driving signal lines 7 is particularly located in the gap between adjacent pixel unit groups, and each common electrode signal line is particularly located in the gap between adjacent pixel unit groups other than those with touch driving signal lines 7 disposed.

Specific structures of touch sensing electrodes for realizing touch function in the above-mentioned touch screen will be described in detail below.

For example, touch sensing electrodes may be located between the base substrate and the black matrix area of upper substrate, and may also on one side of the black matrix area of the upper substrate that faces the liquid crystal layer.

Specifically, the positions of touch sensing electrodes correspond to the positions of common electrodes, which can reduce right opposite areas between touch sensing electrodes and touch driving electrodes. Since the precision of a touch screen is generally on the order of millimeters, while the precision of a liquid crystal display is generally on the order of microns, it can be seen that the precision for display is much higher than that for touch. Therefore, generally, each touch sensing electrode and each common electrode would correspond to a plurality rows of pixel units. Furthermore, gaps between touch sensing electrodes may be set according to the specifically required touch precision, that is, it is just required to ensure that projections of touch sensing electrodes on the array substrate are within areas where common electrodes are. Each of the touch sensing electrodes has a width not greater than the width of the common electrode, touch sensing electrodes may also be disposed with at least one common electrode between them, and it is also possible to provide touch sensing electrodes and common electrodes in an one to one correspondence, which is not limited here.

Figure 7:
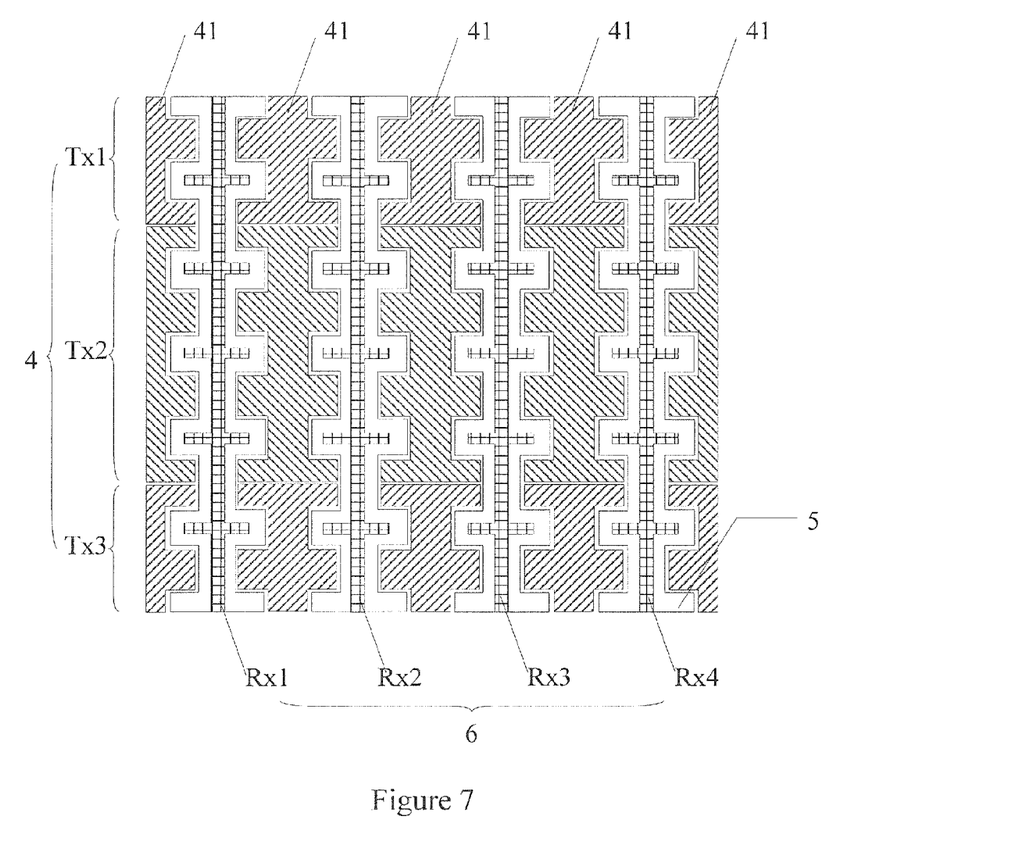
FIG. 7 is a schematic diagram of a projection of touch sensing electrodes onto the array substrate in the capacitive in-cell touch screen provided in an embodiment of the present invention.
Figure 8A:
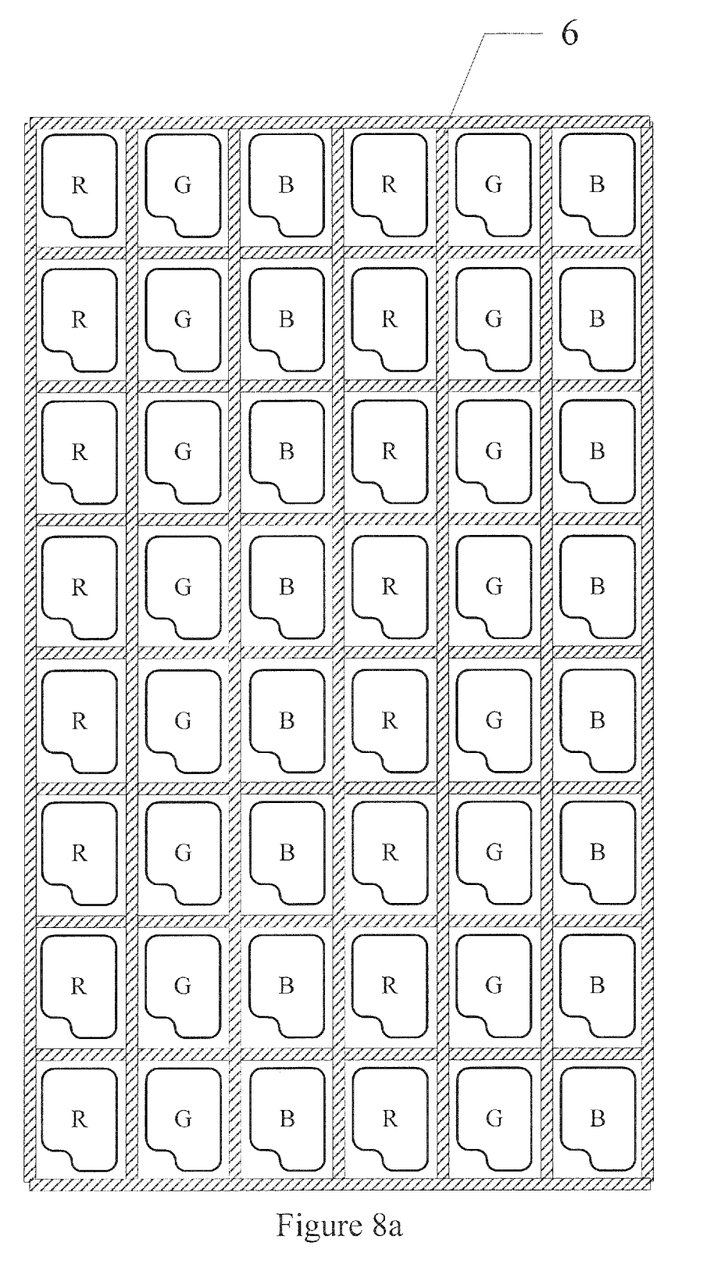
FIGS. 8a and 8b are top views of an upper substrate in the capacitive in-cell touch screen provided in an embodiment of the present invention respectively.
Figure 8B:
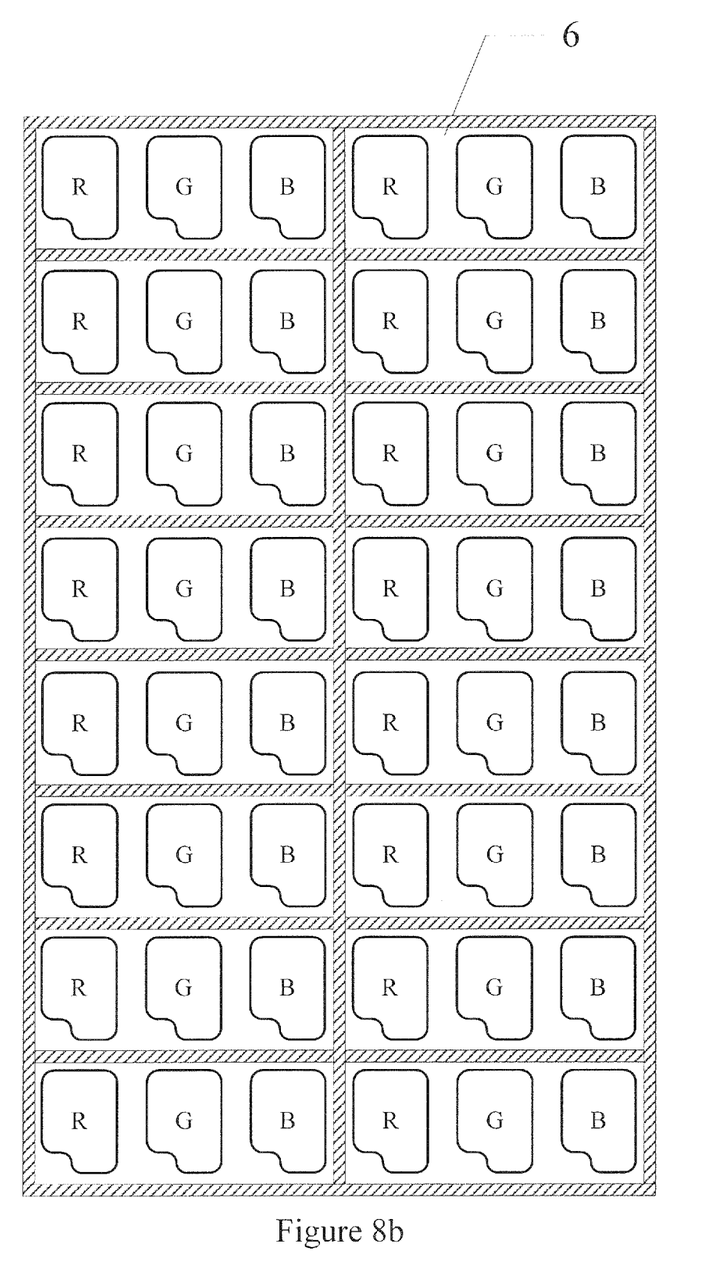

For example, in a specific implementation, the shapes of touch sensing electrodes coincide with the shapes of the areas where common electrodes are, and the orthogonal projection of each touch sensing electrode on the array substrate may have a size equal to the size of corresponding area where the corresponding common electrode is. Alternatively, in order to further improve SNR of the touch screen, as shown in FIG. 7, it is also possible to set orthogonal projections of touch sensing electrodes 6 on the array substrate to be smaller than corresponding areas where common electrodes 5 are, as shown by touch sensing electrodes Rx1, Rx2, Rx3 shown in FIG. 7. It can be concluded from simulation calculation results that, in this structure, ifs possible to effectively increase proportion of mutual capacitance variation caused by finger touch and improve touch accuracy.

For example, in a specific implementation, the shapes of touch sensing electrodes coincide with the shapes of the areas where common electrodes are, and the orthogonal projection of each touch sensing electrode on the array substrate may have a size equal to the size of corresponding area where the corresponding common electrode is. Alternatively, in order to further improve SNR of the touch screen, as shown in FIG. 7, it is also possible to set orthogonal projections of touch sensing electrodes 6 on the array substrate to be smaller than corresponding areas where common electrodes 5 are, as shown by touch sensing electrodes Rx1, Rx2, Rx3 shown in FIG. 7. It can be concluded from simulation calculation results that, in this structure, it's possible to effectively increase proportion of mutual capacitance variation caused by finger touch and improve touch accuracy.

Since the touch sensing electrodes of grid-like structure disposed on the upper substrate will not block pixel units, the material for touch sensing electrodes may be a transparent conducting material such as ITO or IZO, and also may be a metallic material. When the touch sensing electrodes are made of metallic materials, it is possible to reduce their resistance effectively.

Preferably, in the above-mentioned touch screen provided in embodiments of the present invention, when disposing wires connected with touch driving electrodes and touch sensing electrodes in the non-display areas, single side wiring or double side wiring may be used, which is not limited here.

Base on the same inventive concept, an embodiment of the present invention further provides a display device including the above-mentioned capacitive in-cell touch screen provided in embodiments of the present invention. Embodiments of the above-mentioned capacitive in-cell touch screen may be referred to for implementations of the display device and repetitions will not be described any more.

In the capacitive in-cell touch screen and the display device provided in embodiments of the present invention, the common electrode layer connected in the entire surface in the array substrate is divided to form touch driving electrodes and common electrodes which are insulated from each other and alternatively disposed, touch sensing electrodes are disposed on the upper substrate and touch driving electrodes are driven in a time-division manner to realize touch function and display function. In the above-mentioned touch screen provided in embodiments of the present invention, projections of touch sensing electrodes on the array substrate are disposed in areas where common electrodes are, while common electrodes and touch driving electrodes are located in the same layer and insulated from each other, therefore it's possible to effectively reduce right opposite areas between touch sensing electrodes and touch driving electrodes, hence reducing the opposite capacitance formed at the right opposite areas. Furthermore, sides of each touch driving electrodes and sides of the adjacent common electrode are both provided as non-straight lines, and shapes of touch sensing electrodes and areas where common electrodes are set to be consistent, therefore it is possible to increase opposite areas between each adjacent touch driving electrode and touch sensing electrode, and thereby increasing projection capacitance between touch driving electrodes and touch sensing electrodes per unit area. By increasing the proportion of projection capacitance over opposite capacitance, it is possible to increase proportion of variation amount of mutual capacitance caused by finger touching, and in turn improve the touch accuracy.

Obviously, those skilled in the art can make various modifications and variations to the present invention without departing from the spirit and scope of the present invention. Thus, if these modifications and variations of the present invention fall within the scope of claims and equivalents of the present invention, the present invention is intended to encompass these modifications and variations too.

The invention claimed is:

1. A capacitive in-cell touch screen, comprising an upper substrate, an array substrate with a common electrode layer and a liquid crystal layer between the upper substrate and the array substrate, wherein the common electrode layer consists of a plurality of touch driving electrodes and a plurality of common electrodes, and the plurality of touch driving electrodes and the plurality of common electrodes are insulated from each other and disposed alternatively, and sides of each of the touch driving electrodes and sides of each of the common electrodes adjacent to the touch driving electrodes are both non-straight lines; in a display time for one frame of picture, the touch driving electrodes are loaded with common electrode signals and touch scanning signals in a time-division manner;

the upper substrate has a plurality of touch sensing electrodes, of which orthogonal projections on the array substrate are located in areas where the common electrodes are, and the shape of the touch sensing electrodes coincide with the shape of the areas where the common electrodes are.

2. The touch screen of claim 1, wherein the non-straight lines of the sides of each touch driving electrode and the sides of each adjacent common electrode are both of step-like shapes fitting each other; and/or, the non-straight lines of the sides of each touch driving electrode and the sides of each adjacent common electrode are both of convexo-concave shapes fitting each other.

3. The touch screen of claim 1, wherein orthogonal projections of the touch sensing electrodes on the array substrate are smaller than corresponding areas where the common electrodes are.

4. The touch screen of claim 1, wherein a plurality of pixel units arranged in a matrix are formed in the capacitive in-cell touch screen; the touch driving electrodes extend in a row direction of pixel units; and the touch sensing electrodes and common electrodes extend in a column direction of pixel units.

5. The touch screen of claim 4, wherein the common electrodes are strip electrodes, each of the touch driving electrodes comprises a plurality of touch driving sub-electrodes disposed in a same row, and the touch driving sub-electrodes are located in a gap between adjacent common electrodes.

6. The touch screen of claim 5, wherein the array substrate has a plurality of touch driving signal lines between adjacent pixel units, and each touch driving sub-electrode of the touch driving electrode is electrically connected with each other through at least one touch driving signal line.

7. The touch screen of claim 6, wherein the array substrate has a plurality of common electrode signal lines between adjacent pixel units, and the common electrodes are electrically connected with the common electrode signal lines.

8. The touch screen of claim 7, wherein in the array substrate, every two adjacent rows of pixel units are grouped as one pixel unit group, there are two gate signal lines between these two rows of pixel units for providing a gate scanning signal to one of the two rows of pixel units respectively.

9. The touch screen of claim 8, wherein the touch driving signal lines are located in gaps between adjacent pixel unit groups, and the common electrode signal lines are located in gaps between adjacent pixel unit groups other than those gaps where the touch driving signal lines are disposed.

10. The touch screen of claim 9, wherein the touch driving signal lines and the common electrode signal lines are disposed in a same layer as the gate signal lines in the array substrate; the touch driving signal lines are electrically connected with corresponding touch driving sub-electrodes through at least one via hole; and the common electrode signal lines are electrically connected with corresponding common electrodes through at least one via hole.

11. The touch screen of claim 1, wherein the touch sensing electrodes are located on one side of a black matrix area of the upper substrate that faces the liquid crystal layer.

12. The touch screen of claim 1, wherein the touch sensing electrodes have a grid-like electrode structure covered by the black matrix area.

13. The touch screen of claim 1, wherein a material for the touch sensing electrode is a transparent conducting material or a metallic material.

14. A display device comprising the capacitive in-cell touch screen of claim 1.

15. The touch screen of claim 2, wherein orthogonal projections of the touch sensing electrodes on the array substrate are smaller than corresponding areas where the common electrodes are.

16. The touch screen of claim 2, wherein a plurality of pixel units arranged in a matrix are formed in the capacitive in-cell touch screen; the touch driving electrodes extend in a row direction of pixel units; and the touch sensing electrodes and common electrodes extend in a column direction of pixel units.

17. The touch screen of claim 3, wherein a plurality of pixel units arranged in a matrix are formed in the capacitive in-cell touch screen; the touch driving electrodes extend in a row direction of pixel units; and the touch sensing electrodes and common electrodes extend in a column direction of pixel units.

* * * * *